United States Patent
Brunotte et al.

(10) Patent No.: US 9,088,229 B2
(45) Date of Patent: Jul. 21, 2015

(54) SHAFT-DRIVEN GENERATOR SYSTEM

(75) Inventors: Christoph Brunotte, Erlangen (DE); Marc Hiller, Lauf an der Pegnitz (DE); Rainer Sommer, Heroldsbach (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 81 days.

(21) Appl. No.: 13/702,477

(22) PCT Filed: May 2, 2011

(86) PCT No.: PCT/EP2011/056892
§ 371 (c)(1),
(2), (4) Date: Dec. 6, 2012

(87) PCT Pub. No.: WO2011/154196
PCT Pub. Date: Dec. 15, 2011

(65) Prior Publication Data
US 2013/0300380 A1    Nov. 14, 2013

(30) Foreign Application Priority Data
Jun. 8, 2010 (DE) .......................... 10 2010 023 019

(51) Int. Cl.
*H02P 9/00* (2006.01)
*B63H 21/20* (2006.01)
*B63J 3/02* (2006.01)
(Continued)

(52) U.S. Cl.
CPC ................ *H02P 9/007* (2013.01); *B63H 21/20* (2013.01); *B63J 3/02* (2013.01); *H02J 4/00* (2013.01); *H02M 5/458* (2013.01); *H02M 7/483* (2013.01);
(Continued)

(58) Field of Classification Search
USPC ......................................................... 322/59
See application file for complete search history.

(56) References Cited

U.S. PATENT DOCUMENTS 6,532,140 B1    3/2003   McMahon et al.
7,239,035 B2    7/2007   Garces et al.
(Continued)

FOREIGN PATENT DOCUMENTS

CN    101432188 A    5/2009
CN    101594045 A    12/2009
(Continued)

OTHER PUBLICATIONS

Translation of EP 682402 A1.*
(Continued)

*Primary Examiner* — Tulsidas C Patel
*Assistant Examiner* — Sean Gugger
(74) *Attorney, Agent, or Firm* — Henry M. Feiereisen LLC (57) ABSTRACT

A shaft-driven generator system has a generator connected to a converter. An inverter supplies an AC voltage on a network side. The converter and the inverter are linked via a DC link circuit. The inverter has at least two phase modules, which each have an upper and a lower valve branch, which each have a plurality of two-pole sub-systems connected electrically in series. Each sub-system has a unipolar storage capacitor, to which a series circuit of two gate-controlled turn-off semiconductor switches is connected electrically in parallel. Each semiconductor switch has a diode connected antiparallel therewith. Thus, a shaft-driven generator system is obtained that has a DC-link converter as a static frequency converter for complying with the required network feedback and for managing transient operating states.

8 Claims, 4 Drawing Sheets

(51) Int. Cl.
*H02J 4/00* (2006.01)
*H02M 5/458* (2006.01)
*H02M 7/483* (2007.01)

(52) U.S. Cl.
CPC ..... *H02M 2007/4835* (2013.01); *Y02T 70/5281* (2013.01)

(56) References Cited

U.S. PATENT DOCUMENTS

| | | | |
|---|---|---|---|
| 2003/0058662 A1* | 3/2003 | Baudelot et al. | 363/37 |
| 2006/0022524 A1 | 2/2006 | Bryde et al. | |
| 2006/0214645 A1 | 9/2006 | Rufer et al. | |
| 2007/0114796 A1 | 5/2007 | Garces et al. | |
| 2008/0048452 A1* | 2/2008 | Wobben | 290/40 B |
| 2008/0203978 A1* | 8/2008 | Schreiber | 322/8 |
| 2008/0232145 A1 | 9/2008 | Hiller et al. | |
| 2009/0045761 A1 | 2/2009 | Fuchs et al. | |
| 2009/0196078 A1* | 8/2009 | Gruber et al. | 363/36 |
| 2009/0225570 A1 | 9/2009 | Pereira | |
| 2010/0244450 A1* | 9/2010 | Tabe | 290/53 |
| 2011/0002149 A1 | 1/2011 | Hiller et al. | |
| 2011/0037442 A1* | 2/2011 | Tormanen et al. | 322/44 |
| 2011/0187480 A1* | 8/2011 | Schierling et al. | 333/173 |

FOREIGN PATENT DOCUMENTS

| | | |
|---|---|---|
| CN | 101635466 A | 1/2010 |
| CN | 201430498 Y | 3/2010 |
| DE | 101 03 031 A1 | 7/2002 |
| DE | 10 2005 059 760 A1 | 7/2007 |
| DE | 10 2006 020 144 B4 | 6/2008 |
| DE | 10 2008 022 617 A1 | 11/2009 |
| DE | 10 2008 026 869 A1 | 12/2009 |
| EP | 0 682 402 A1 | 11/1995 |
| EP | 682402 A1 * | 11/1995 |
| EP | 1 813 807 A2 | 8/2007 |
| EP | 2 088 668 A2 | 8/2009 |
| FR | 11 99 238 A | 12/1959 |
| JP | H11-89242 A | 3/1999 |
| JP | 2004-064830 A | 2/2004 |
| JP | 2005-080414 A | 3/2005 |
| JP | 2009 506736 A | 2/2009 |
| JP | 2009 514490 A | 4/2009 |
| JP | 2009 535258 A | 10/2009 |
| RU | 2 110 441 C | 5/1998 |
| RU | 2 233 525 C2 | 7/2004 |
| RU | 2 337 465 C1 | 10/2008 |
| RU | 2008 139614 A | 4/2010 |
| WO | WO 2007/124968 A1 | 11/2007 |
| WO | WO 2009-098201 A1 | 8/2009 |
| WO | WO 2009-146961 A1 | 12/2009 |

OTHER PUBLICATIONS

Rolf Büschen; WGA 23—ein modemes Wellengeneratorsystem; Sonderdruck aus "HANSA", 120, Jahrgang, No. 13, Jul. 1, 1983, Seiten 1203-1207; Magazine; 1983; DE.

Netzgestaltung mit Duplexdrosseln W. Schild, Dr. W. Planitz Jahrbuch der Schiffbautechnischen Gesellschaft 91. Band, 1997, Seiten 173 ff.; Book; 1997; DE.

Jahrbuch der Schiffbautechnischen Gesellschaft Michael Steffes 96. Band, 2002, Seiten 10 bis 16; Book; 2002; DE.

* cited by examiner

SHAFT-DRIVEN GENERATOR SYSTEM

CROSS-REFERENCES TO RELATED APPLICATIONS

This application is the U.S. National Stage of International Application No. PCT/EP2011/056892, filed May 2, 2011, which designated the United States and has been published as International Publication No. WO 2011/154196 and which claims the priority of German Patent Application, Serial No. 10 2010 023 019.7, filed Jun. 8, 2010, pursuant to 35 U.S.C. 119(a)-(d).

BACKGROUND OF THE INVENTION

The invention relates to a shaft-driven generator system with a shaft-driven generator.

A shaft-driven generator system is known from the German publication "WGA 23—ein modernes Wellengeneratorsystem (WGA 23—a modern shaft-driven generator system)", Special Edition of the German periodical "HANSA", Vol. 120, No. 13, 1983, July edition, P. 1203-1207. Shaft-driven generator systems are systems frequently used on ships for low-cost generation of electrical energy. The shaft-driven generator system, which is a component of an on-board power network of a ship, comprises the following components:

- the shaft-driven generator driven at variable speed for generating electrical energy at variable frequency,
- the frequency converter embodied as a DC-link converter for frequency-related decoupling and voltage-related decoupling of shaft-driven generator from an on-board network, consisting of generator-side rectifier, network-side inverter and intermediate DC link circuit,
- the DC link choke required for DC-link converters for smoothing the DC link current,
- the DC link capacitor required for DC-link converters for smoothing the DC link voltage,
- the network choke for limiting short-circuit current and harmonics,
- the reactive power machine with built-in run-up motor required for enhancing short-circuit protection and to meet the reactive current needs of the network,
- the field rectifier if necessary with matching transformer to adjust the shaft-driven generator exciter current as part of shaft-driven generator closed-loop control,
- the fully-electronic closed-loop, open-loop and monitoring system and
- the battery splitter for supplying the vital functions of the shaft-driven generator system in the event of faults and short circuits.

This shaft-driven generator system is able to be connected on the network side by means of the switch to an on-board network busbar. To securely avoid extreme loads in the network, a so-called duplex choke is provided as the network choke. By means of this duplex choke the propagation of harmonics is prevented and the short-circuit currents are significantly reduced. Duplex chokes are frequently also referred to as current divider choke coils, balancing chokes or smoothing chokes. The ideal duplex choke is a special transformer with two windings of low stray inductance on an iron core with a number of small air gaps.

The article "Netzgestaltung mit Duplexdrosseln (Designing networks with Duplex chokes)" by W. Schild and Dr. W. Planitz, printed in the German publication Jahrbuch der Schiffbautechnischen Gesellschaft (shipbuilding society yearbook), Vol. 91, 1997, P. 173 ff., discloses how a duplex choke is used for increasing protection against short circuits. In this publication two network concepts for improving the network quality on a diesel-electric-driven ferry with the aid of duplex chokes is presented. When duplex chokes are used the effects on the electrical propulsion systems are reduced. These effects on the network, which emanate from the converter of a shaft-driven generator system, generate significant harmonics in the supplying on-board network, whereby the network quality is reduced.

The service network on a ship for the supply of auxiliary units, the lighting, the nautical devices and the communication as well as the supply systems in the living area need a low-harmonic supply voltage. Exaggerated harmonic distortion can lead to additional losses, operational faults and in extreme cases to destruction of components. A sub-network with a low harmonic distortion is decoupled by means of duplex chokes.

This article also reveals that, with shaft outputs of 10 MW and more, direct converter fed synchronous motors are used as propeller drives. As well as direct converter-fed synchronous motors, converter motors with load-commutated converters are also employed as the propeller drive.

DE 10 2006 020 144 B4 discloses a method for operating a ship's drive system with a waste heat recovery as well as a ship's drive system with waste heat recovery. The ship's drive system features units such as a shaft-driven generator/motor which is supplied by means of the converter with a network-side transformer from the on-board network. The operation of the shaft-driven generator as a motor is referred to as "Power-Take-In" (PTI). The shaft-driven generator, the static frequency converter and the network-side transformer, as soon as energy is fed from the shaft-driven generator into the on-board network, likewise form a shaft-driven generator system. The operation of the shaft-driven generator as a generator, i.e. electrical energy is generated for an on-board network, is referred to as "Power-Take-Off" (PTO). In this patent however this shaft-driven generator is primarily used as booster drive alongside the diesel engine drive. This enables the main drive to be operated with favorable consumption and the diesel generator sets to be switched off.

During the period of the switchover from motor operation of the shaft-driven generator into generator operation, an energy source feeds electrical energy into the ship's network such that voltage and frequency of the ship's network do not fall below a predefined limit value. Such a switchover occurs in the event of network faults, especially a blackout of the ship. If the known shaft-driven generator system is used as a booster drive, the reactive power machine forms this energy source during the motor/generator operation switchover, from which the on-board network is supplied with energy.

In an alternative embodiment of the shaft-driven generator system a voltage source inverter is provided as a static frequency converter. This voltage source inverter has a DC link capacitor which forms the energy source, which supplies energy into the ship's network during the operational switchover of the shaft-driven generator. An especially rapid switchover is achieved if the DC link voltage converter has a self-commutated pulse-controlled converter on the generator and network side respectively, especially IGBT pulse-controlled converter.

This type of voltage source inverter with an IGBT pulse-controlled converter on the generator and network side respectively is shown in greater detail in FIG. 3 of DE 10 2005 059 760 A1. By using a voltage source inverter instead of a current source converter as drive converter in a shaft-driven generator system as booster drive, the on-board network is not only decoupled from the generator as regards frequency but also as regards voltage. In addition the voltage source inverter can provide reactive power so that a reactive power machine is no longer needed.

If a current-source converter is used as the static frequency converter of the shaft-driven generator system, in addition to a duplex choke, a transformer, a reactive power machine with run-up motor is needed. As already described at the start, to increase the short-circuit protection, a duplex choke is needed, which is ideally a special transformer. The transformer is needed for voltage matching between converter output voltage and on-board network voltage. These additional components each need installation space, which is not readily available on ships.

If a voltage source inverter were to be used as a static frequency converter of the shaft-driven generator system, a transformer would be provided for voltage matching between converter output voltage and on-board network voltage. The two converters of the voltage source inverter would have to be embodied either in two-point topology (low voltage) or three-point topology (medium voltage). For outputs of 10 MW and more a number of two-point or three-point converters would have to be connected electrically in parallel on the output side, wherein a balancing closed-loop control, known as an Δi closed-loop control, would have to be present. Semiconductor switches that can be switched off, especially IGBT (Insulated Gate Bipolar Transistor) switches of voltage class 1200V or 1700V are currently used in low-voltage converters. In medium-voltage converters on the other hand, IGBTs or IGCTs of voltage class 3300V or 4500V or 6500V are used. As the voltage class increases however the switching frequency decreases but the semiconductor price increases.

The limited switching frequencies of the IGBTs means that filter measures would have to be implemented on the on-board network side in order to comply with the system perturbation requirements of the classification societies. Particularly when medium-voltage converters are used with a DC link voltage of far beyond 1 kV, the switching frequency is restricted to a few hundred Hertz. This also makes the design of filters more difficult. The filter design is difficult right from the outset since the on-board network involves an island network which, depending on its operating state, can have different impedances and thereby different resonant frequencies. Therefore a resulting resonant frequency acting at the output of a voltage source inverter would vary, which would make matching the filter design to the switching frequency of the voltage source inverter very difficult.

The low switching frequency of the IGBTs of the generator- or network-side converter used as a static frequency converter of a shaft-driven generator system restricts the dynamics of this converter. This makes dealing with transient operating states, such as for example network short circuit, dropout and return of the network voltage, load rejection, almost impossible despite an overdimensioning of the components. In addition the filter mentioned tends to oscillate in transient operating states.

Dealing with network short circuits and other transient operating states becomes particularly important. To somehow be able to deal with these transient operating states, the voltage source inverter of a shaft-driven generator system must always remain on the network, i.e. it may not switch off because of overcurrent. This could be achieved, both in normal operation and also in the event of a short circuit, by the current being regulated by means of a two-point closed-loop control or in individual phases by firing signals being temporarily blocked and subsequently enabled again. In such cases further unpredictable harmonics in the converter output voltage would arise, which would activate any network filter present, meaning that the required limits for network harmonics could only be complied with at great expense.

For these reasons until now, especially for medium-voltage applications, no shaft-driven generator system with a DC-link converter as a static frequency converter has been constructed which completely fulfils the aforementioned requirements in the medium-voltage range.

SUMMARY OF THE INVENTION

The underlying object of the invention is to specify a shaft-driven generator system having a DC-link converter as its static frequency converter, with which network short circuits in particular are to be dynamically limited.

This object is inventively achieved by a shaft-driven generator system with a shaft-driven generator, a DC-link converter and a network-side inductance, wherein the DC-link converter has a converter on the generator side and network side, respectively, which are connected to each other on the DC voltage side, and wherein the network-side converter has at least two phase modules which each have an upper and a lower valve branch, which each have a plurality of two-pole sub-systems connected electrically in series, which each have a unipolar storage capacitor, to which a series circuit of two semiconductor switches that can be switched off (gate-controlled turn-off semiconductor switches) is connected electrically in parallel, each semiconductor switch having a diode connected antiparallel.

The fact that the network-side converter of a DC-link converter is embodied as a converter with distributed energy storage, depending on the number of the sub-modules of each valve branch, enables the output voltage of this converter to be adapted to any given on-board network voltage. The number of sub-modules also means that the number of steps of the voltage curve of the output voltage of this converter likewise increases, so that filter measures no longer have to be implemented on the on-board network side to enable the system perturbation requirements of the classification societies to be complied with. Likewise the high number of sub-modules enables semiconductor switches that can be switched off from the low-voltage area and which can be operated with a significantly higher switching frequency to be used in medium-voltage converters. This results in this converter with distributed energy storage exhibiting a high resulting switching frequency so that an output current of this converter can be limited highly dynamically in the event of a short-circuit by the rapid adaptation of the terminal voltages. This means that this converter no longer switches off because of overcurrent in the event of a short circuit. Thus the requirements of the ship's networks in respect of injecting the short-circuit currents can be simply fulfilled. This means that the inventive voltage source inverter, as a static frequency converter of a shaft-driven generator system, has short-circuit protection which can be provided without a duplex choke.

The high switching frequencies of the low-voltage IGBTs (LV-IGBT) used in the sub-modules of the converter with distributed energy storage means that this converter exhibits a very high resulting switching frequency. This enables the limit frequency of an associated closed-loop control to likewise be shifted to high values, so that this lies outside an area of possible resonances of the on-board network. This makes parameterization independent of the system possible.

Because of the closed-loop control properties of a converter with distributed energy storage, in the voltage source inverter, of which the network-side converter is a converter with distributed energy storage and of which the generator-side converter is a non-controlled converter, for example a diode rectifier, a DC link current of this current source converter can be kept almost constant. This means that the generator currents of the generator of the shaft-driven generator system exhibit a lower harmonic content, wherein the root mean square is lower. The fact that the generator currents are almost block-shaped means that the losses of the shaft-driven generator system are reduced.

BRIEF DESCRIPTION OF THE DRAWING

For further explanation of the invention the reader is referred to the drawings, in which exemplary embodiments of an inventive shaft-driven generator system are illustrated in schematic diagrams.

FIG. 1 shows a basic circuit diagram of a known ship's drive system with a voltage source inverter as shaft-driven generator drive converter, while

FIG. 4 shows a second form of embodiment of a shaft-driven generator system in accordance with the invention, wherein

DETAILED DESCRIPTION OF PREFERRED EMBODIMENTS

Figure 1:
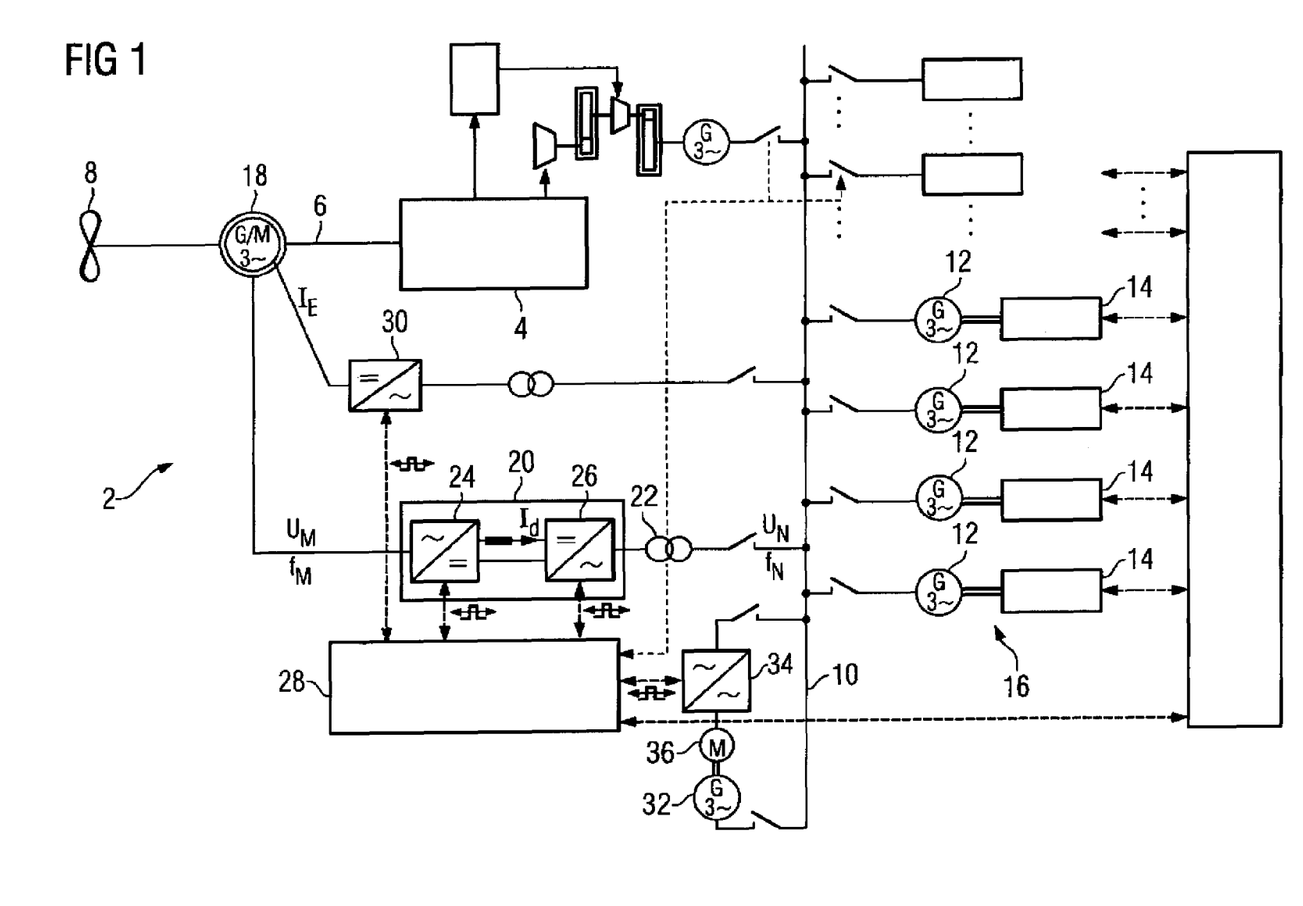

The ship's drive system 2 known from DE 10 2006 020 144 B4, in accordance with FIG. 1 features main engine 4, embodied as a slow-running two-stroke diesel engine, which via a propeller shaft 6 features a ship's propeller 8 for driving the ship. To generate energy for a ship's network, indicated by an on-board network busbar 10, a number of generators 12 are provided, which are each driven by an auxiliary engine 14 running more quickly than the main engine. The auxiliary engines 14 usually involve fast-running four-stroke diesel engines. Usually a generator 12 and a diesel engine 14 are combined into a diesel generator set 16 in each case.

A shaft-driven generator/motor 18 is coupled mechanically to the propeller shaft 6 and is linked electrically via a converter 20 and a transformer 22 to the on-board network busbar 10 of the ship's network. A voltage source inverter is provided as the converter 20 which, on the generator and network side respectively, has a controllable converter 24 and 26 which, on the DC voltage side, are linked electrically-conductively to one another by means of a DC link choke. The control signals for these two controllable converters 24 and 26 are generated by an open-loop and closed-loop control system 28. Since a slow-running synchronous machine is used as the shaft-driven generator/motor 18, this is additionally linked in an electrically conductive manner via an excitation converter 30 to the on-board network busbar 10. Since a voltage source inverter is provided as the converter 20 of the shaft-driven generator system, and this can only feed active power into the ship's network, the reactive power demand of the ship's network is provided by a reactive power machine 32. This reactive power machine 32 operates in normal operation only as a phase shifter and does not feed any active power into the on-board network busbar 10. A run-up converter 34 and a run-up motor 36 are used to run-up the reactive power machine 32. The run-up converter 34 is likewise controlled by the open-loop and closed-loop control system 28.

The shaft-driven generator/motor 18, the current-source converter with associated open-loop and closed-loop control system 28 and the reactive power machine 32 with run-up converter 34 and run-up motor 36 form a shaft-driven generator system, which is known from the article of the German periodical "HANSA" mentioned at the start.

In this known ship's drive system the shaft-driven generator 18 is operated as a motor, through which electrical energy from the ship's network is converted by means of the voltage source inverter and the shaft-driven generator/motor 18 into mechanical energy. This process means that power reserves in the ship's network are used to enhance the drive power of the ship, through which either the speed of the ship is increased or the load on the main engine is able to be relieved while the speed of the ship remains the same.

Figure 2:
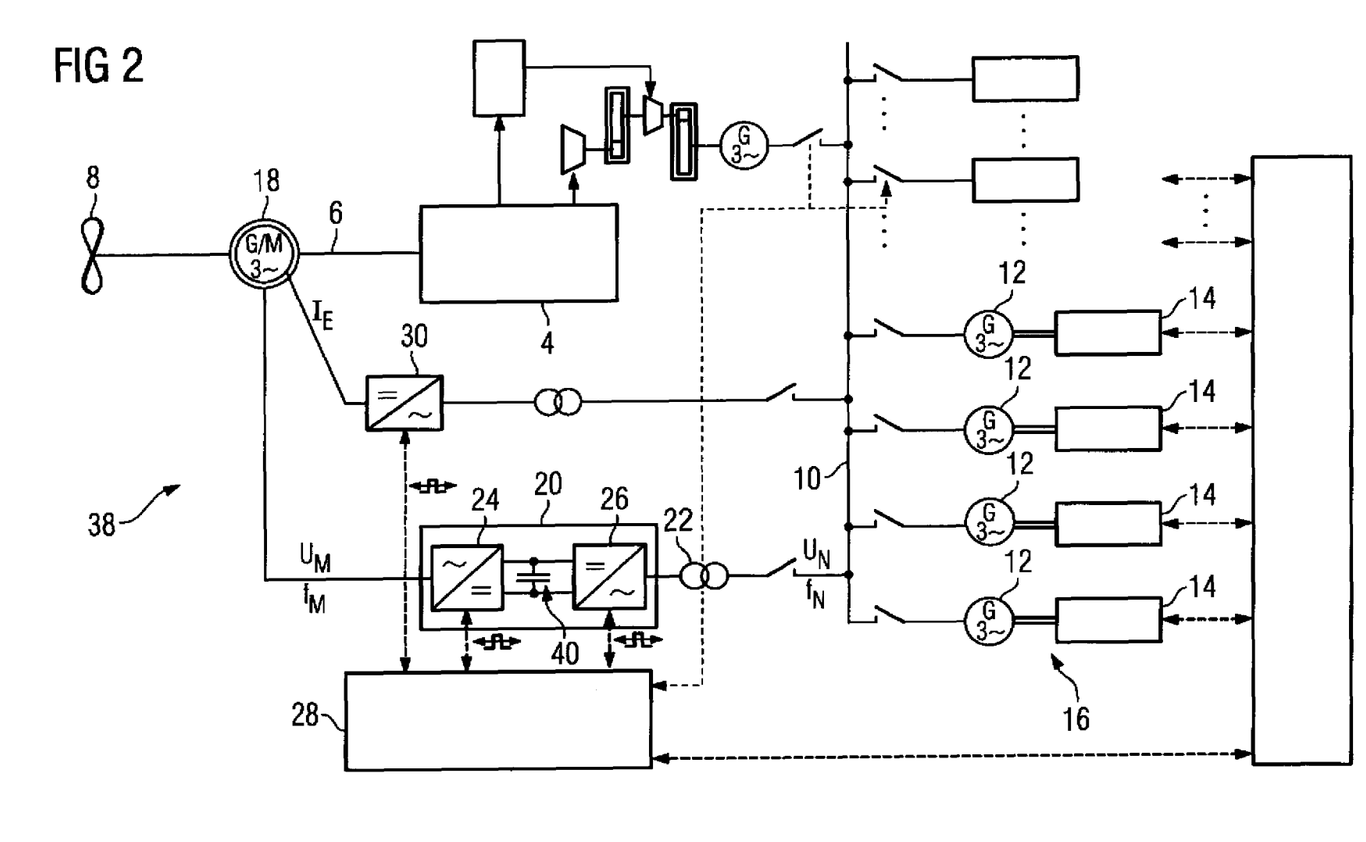
FIG. 2 shows a basic circuit diagram of this known ship's drive system with a voltage source inverter as shaft-drive generator drive converter.

In order to be able to at least dispense with the separate reactive power machine 32 with run-up converter 34 and run-up motor 36, a basic circuit diagram of a further known ship's drive system 38 is shown schematically in FIG. 2. This ship's drive system 38 differs from the ship's drive system 2 according to FIG. 1 in that a voltage source inverter is provided as the converter 20. Since the shaft-driven generator 18 is operated as a motor, this voltage source inverter, as well as a DC link capacitor battery 40, also has a controllable converter 24 on the generator side. A self-commutated pulsed converter, especially an IGBT pulsed converter, is provided as a controllable converter 24 and 26 of this voltage source inverter. The DC link capacitor battery 40 is dimensioned such that, during the switchover of the shaft-driven generator 18 from motor operation into generator operation, electrical energy is fed into the ship's network such that the voltage and the frequency of the ship's network cannot fall below predetermined limit values in each case.

This shaft-driven generator system is only switched over in the event of an unplanned failure of the energy generation by the waste heat recovery system from motor operation to generator operation. This switchover lasts until such time as the diesel generator sets 16 are started. This means that the generator operation of the shaft-driven generator system is only intended for a short bridging period. For this bridging period a harmonic content in the on-board network of the ship is taken into account. In order to reduce this harmonic content in the on-board network, filter measures would be required on the on-board network side, but these are not shown. Thus this shaft-driven generator system is predominantly used as a booster drive.

The fact that the converter valves, for example Insulated-Gate Bipolar Transistors (IGBT) of the network side converter 26 of the voltage source inverter, because of a high converter output voltage, have restricted switching frequencies, means that the filter design of an existing filter is made additionally more difficult. The filter design is rendered especially more difficult because the on-board network of the ship involves an island network which, depending on the consumers being operated, can exhibit greatly differing impedances and thus different resonant frequencies. Thus the resulting resonant frequency also acting on the network-side terminals of the converter 20 varies, which renders designing the filter to match the switching frequencies of the converter more difficult.

As a result of the limited switching frequency of the HV-IGBT of the network-side converter 26 and the associated, restricted dynamics, dealing with transient operating states, such as load rejection, short circuit in the on-board network, network restoration etc. is difficult and inevitably leads to an overdimensioning of the components of this voltage source inverter. A further difficulty which is hard to overcome consists of a filter used having a tendency to oscillate in transient operating states.

In order to be able to comply with the system perturbation requirements of the classification societies and be able to deal with network short circuits and other transient operating states, this voltage source inverter is not suitable as a static frequency converter of the shaft-driven generator system. For this reason this shaft-driven generator system with a voltage source inverter is predominantly operated as a motor, wherein for operation as a generator to which a switch is only made on occurrence of the fault of the energy generation systems during a switchover period, account is taken of the fact that the system perturbation requirements cannot be met. It is likewise assumed that transient operating states do not occur in this operating state. This operation of the shaft-driven generator system as a generator only lasts until such time as the diesel generator sets 16 are run up.

Figure 3:
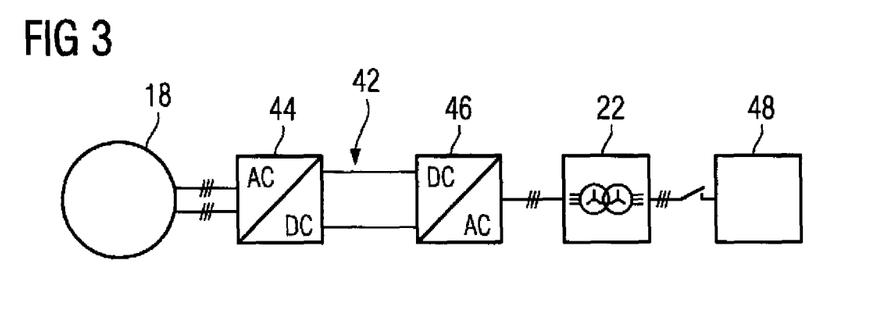
FIG. 3 shows a first form of embodiment of a first shaft-generator system in accordance with the invention.

FIG. 3 shows a first embodiment of a shaft-driven generator in accordance with the invention as a schematic diagram. This inventive shaft-driven generator system, in addition to a shaft-driven generator 18, has a voltage source inverter 42 which has as its generator-side converter 44 a non-controlled converter, for example a six-pulse or higher-pulse diode rectifier. A multi-pulse self-commutated converter can also be provided as the generator-side converter 44. As the network-side (on-board network-side) converter 46, the inventive shaft-driven generator system has a converter with distributed energy storage. Both converter 44 and 46 are directly connected to one another electrically-conductively on the DC voltage side. On the AC voltage side the converter 46 in the embodiment of converter with distributed energy storage is able to be linked by means of a transformer 22 to an on-board network 48.

Figure 4:
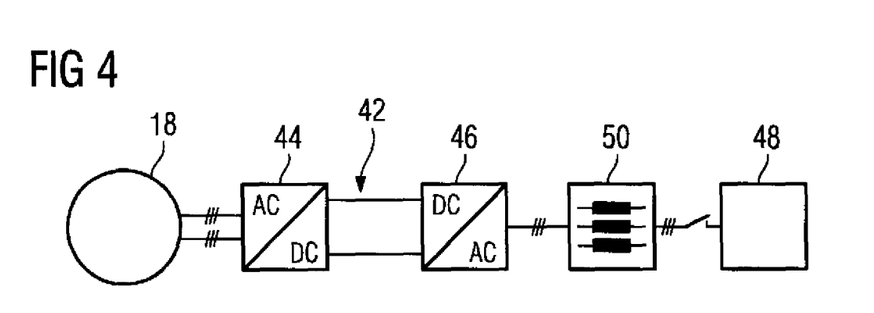

FIG. 4 shows a second embodiment of a shaft-driven generator system in accordance with the invention as a schematic diagram. This embodiment differs from the embodiment in accordance with FIG. 3 in that the network-side converter 46 embodied as a converter with distributed energy storage is able to be connected on the AC voltage side by means of a network choke 50 to the on-board network 48.

Figure 5:
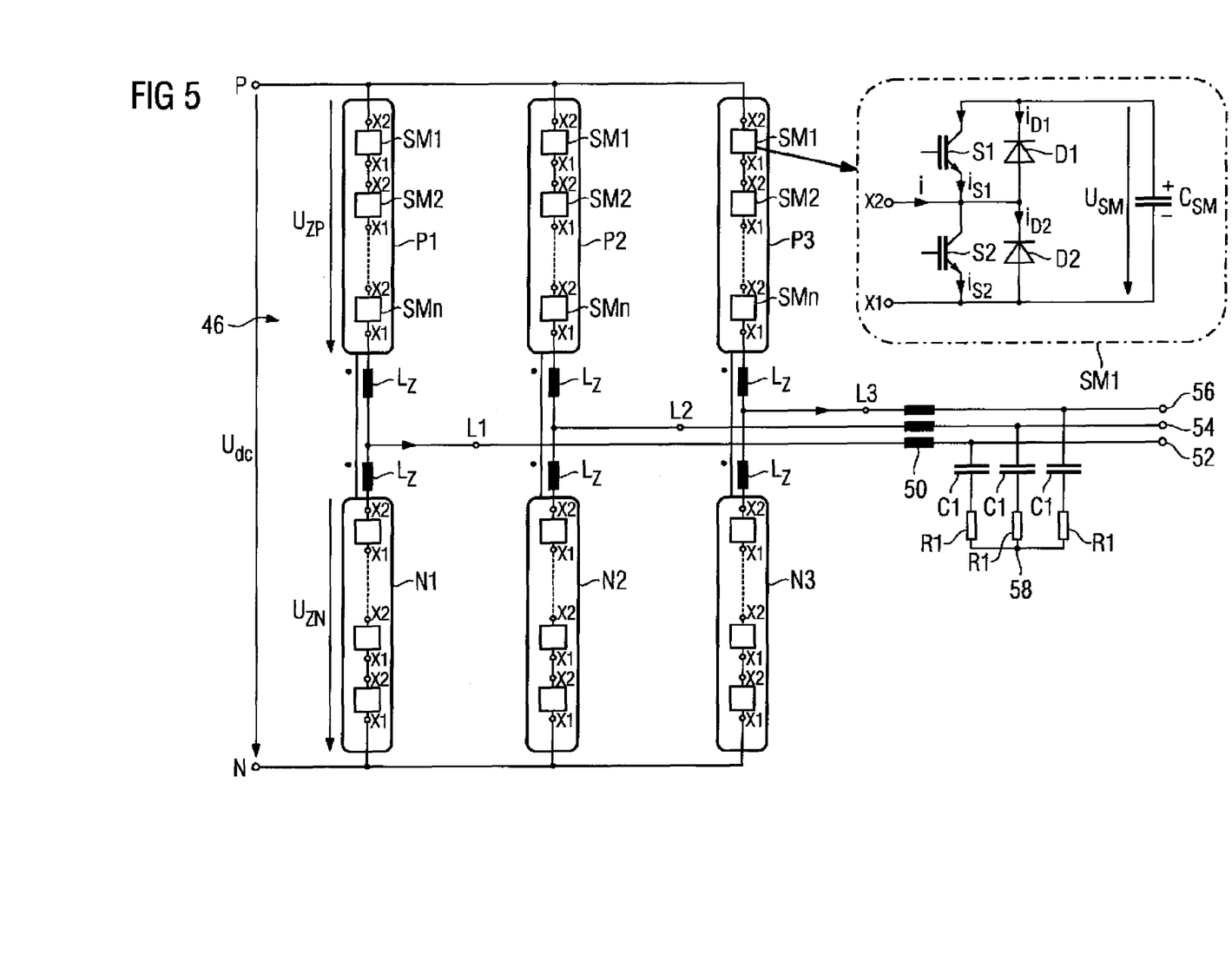
FIG. 5 illustrates a basic circuit diagram of a network-side converter of the shaft-generator system in accordance with FIG. 3 or 4 in an advantageous embodiment.

An equivalent circuit diagram of the converter 46 with distributed energy storage is shown in greater detail in FIG. 5. In accordance with this diagram this converter 46 has three phase modules, which each have an upper and a lower valve branch P1 and N1 or P2 and N2 or P3 and N3. These two valve branches P1, N1 or P2, N2 or P3, N3 of each phase module are connected into a bridge branch. A connection point of an upper and a lower valve branch P1 and N1 or P2 and N2 or P3 and N3 is brought out as an AC voltage-side terminal L1, L2 or L3 of each phase module. For smoothing internal converter circuit currents coupled branch chokes $L_z$ are used. The network choke 50 is connected to these AC voltage-side terminals L1, L2 or L3. These three phase modules are electrically parallel to one another and connected to a DC voltage feed device (generator-side converter 44) not shown in any greater detail, which is connected to the DC terminals P and N of the converter 2 with distributed energy storage $C_{SM}$. A generated DC voltage $U_{do}$ is present between these DC terminals P and N.

It can also be seen from this equivalent circuit diagram that each valve branch P1, N1, P2, N2, P3 and N3 has a plurality of two-pole sub-modules SM1, SM2, . . . , SMn connected in series. Each two-pole sub-module SM1, SM2, . . . , SMn, in accordance with the enlarged diagram of the sub-module SM1, has a unipolar storage capacitor $C_{SM}$, two semiconductor switches S1 and S2 that can be switched off and two diodes D1 and D2. The two semiconductor switches S1 and S2 that can be switched off are connected electrically in series and this series circuit is connected electrically in parallel to the unipolar storage capacitor $C_{SM}$. Connected antiparallel to the semiconductor switches S1 and S2 that can be switched off in each case is a diode D1 or D2. These diodes D1 and D2 thus each form a freewheeling diode. A connection point of the two semiconductor switches S1 and S2 that can be switched off is brought out as a module terminal X2. The negative terminal of the unipolar storage capacitor $C_{SM}$ forms a second module terminal X1 In the charge state of the unipolar storage capacitor $C_{SM}$ a capacitor voltage $U_{SM}$ drops.

These capacitor voltages $U_{SM1}$, $U_{SM2}$, . . . , $U_{SMn}$ of the two-pulse sub-systems SM1, SM2, . . . , SMn of each valve branch P1, N1, P2, N2, P3 and N3 are added in each case to a valve voltage $U_{ZP1}$, $U_{ZN1}$, $U_{ZP2}$, $U_{ZN2}$, $U_{ZP3}$ and $U_{ZN3}$. The addition in each case of two valve voltages $U_{ZP1}$, $U_{ZN1}$ or $U_{ZP2}$ and $U_{ZN2}$ or $U_{ZP3}$ and $U_{ZN3}$ of a phase module produces the DC voltage $U_{do}$ present between the DC terminals P and N.

Each of these two-pole sub-modules SM1, SM2, . . . , SMn can be controlled into one of three switching states, namely the switching states I, II and III. Which terminal voltage $U_{X2X1}$ is present in which switching state I, II or III at the module terminals X2 and X1, and how the semiconductor switches S1 and S2 that can be switched off are controlled in the switching states I, II or III is to be found in DE 101 03 031 A1, which discloses this presented converter topology.

Compared to the embodiment of FIG. 4, a series circuit of a capacitor C1 and a resistor R1 is connected in each case between network choke 50 and output terminals 52, 54 and 56 of the shaft-driven generator system, wherein the free ends of these resistors R1 are connected electrically-conductively to one another. The sequence of the two components C1 and R1 of the series circuit can also be reversed from the layout depicted in this diagram. This approach then means that the free ends of the capacitors C1 are connected electrically-conductively to one another. These damped capacitor branches, with the inductances of the network choke 50, form a low-pass filter, wherein the connection point 58 of the three resistors R1 forms a star point of the shaft-driven generator system. At this connection point 58 a high-resistance resistor can be connected against a ground connection of the on-board network 48. Such a high-resistance connection enables a short-to-ground at the high-resistance grounded on-board network 48 to be detected.

With a converter 46 with distributed energy storage $C_{SM}$ by the number of electrically series-connected sub-modules SM1, SM2, SMn on the one hand, the number of step stages of a step-shaped output voltage is determined and on the other hand the converter output voltage can be adapted to any given amplitude of the on-board network, for example a medium-voltage network. The greater the number of two-pole sub-modules SM1, SM2, . . . , SMn of each valve branch P1, N1, P2, N2, P3 and N3 of the phase modules of the converter 46, the more sinusoidal is the converter output voltage. This eliminates the need for any filter measures in order to be able to comply with the system perturbation requirements of the classification societies.

Insulated-Gate Bipolar Transistors, especially LV-IGBTs, are used as semiconductor switches S1 and S2 that can be switched off of each two-pole sub-module SM1, SM2, . . . , SMn. These LV-IGBTs with blocking voltages of 1200V or 1700V can be clocked with a significantly higher pulse frequency compared to HV-IGBTs with blocking voltages of 3300V, 4500V or 6500V. In addition the LV-IGBTs are significantly cheaper compared to the HV-IGBTs. By using LV- IGBTs in the medium voltage converter 42 and a plurality of the two-pole sub-modules SM1, SM2, . . . , SMn, the output current of this converter 42 can be limited in a highly dynamic manner in the event of a short circuit. This enables the requirements of the ship's networks in respect of the injection of short-circuit current to be fulfilled in a simple manner. Since the high number of two-pole sub-modules SM1, . . . , SM2, SMn per valve branch P1, N1, P2, N2, P3 and N3 of the converter 46 enables the on-board network-side filter to be dispensed with, transient operating states can be dealt with more easily. The reason for this is that the transient operating states can no longer excite any harmonics since a filter is no longer present on the on-board network side. Likewise, depending on the number of two-pole sub-modules SM1, SM2, SMn per valve branch P1, N1, P2, N2, P3 and N3 of the converter 46 with distributed energy storage $C_{SM}$, this converter 46 can be easily scaled to any given output voltage, which enables a transformer 22 to be dispensed with in a plurality of applications.

The use of a converter 46 with distributed energy storage as an on-board network-side converter 26 of the voltage source inverter 42 of a shaft-driven generator enables a significantly higher clock frequency to be used for the open-loop and closed-loop control system 28 of this voltage source inverter 42, through which the limit frequency of this control and closed-loop control system 28 lies outside a range of possible resonances. This now makes possible a system-independent parameterization of the converter 46.

By embodying the on-board network-side converter 26 of the voltage source inverter 42 as a converter 46 with a plurality of energy stores $C_{SM}$, a voltage source inverter 42 can now be used as a shaft-driven generator converter 20, so that a reactive power machine 32 with run-up converter 34 and run-up motor 36 is no longer needed. Likewise the filter and the transformer are no longer needed on the on-board network side. Through this converter topology LV-IGBTs are used in the two-pole sub-modules SM1, SM2, . . . , SMn for a medium-voltage converter, whereby this converter 46, in conjunction with a high number of sub-modules SM1, SM2, . . . , SMn, exhibits a high resulting switching frequency so that a short-circuit current can be limited in a highly dynamic manner. By means of a converter 46 with distributed energy storage $C_{SM}$ as on-board network-side converter 26 of the shaft-driven converter, which is a voltage source inverter of which the DC link capacitor battery 40 is distributed over a plurality of storage capacitors $C_{SM}$, enables the network quality on a diesel-electrically-driven ship to be significantly improved.

The invention claimed is:

1. A shaft-driven generator system comprising:
a network implemented as an island network,
a shaft-driven generator,
a network-side inductance, and
a DC-link converter, wherein the DC-link converter comprises
an AC/DC converter connected on an input side to the generator, and
a DC/AC inverter connected on an output side to the island network without an interconnected network-side filter, with the converter connected to the inverter by a DC link circuit,
wherein the inverter has at least two phase modules, each phase module having an upper valve branch and a lower valve branch, each upper valve branch and each lower valve branch having a plurality of two-pole sub-systems electrically connected in series, wherein each two-pole sub-system comprises a series circuit formed of two gate-controlled turn-off semiconductor switches and diodes connected antiparallel with the semiconductor switches in one-to-one correspondence, and a unipolar storage capacitor electrically connected in parallel with the series circuit, and
wherein a number of the two-pole sub-systems electrically connected in series in each of the upper valve branches and the lower valve branches is selected so as to allow use of low-voltage gate-controlled turn-off semiconductor switches.

2. The shaft-driven generator system of claim 1, wherein the AC/DC converter is a multi-pulse diode rectifier.

3. The shaft-driven generator system of claim 1, wherein the AC/DC converter is a multi-pulse self-commutated converter.

4. The shaft-driven generator system of claim 1, wherein the network-side inductance is a transformer.

5. The shaft-driven generator system of claim 1, wherein the network-side inductance is a network choke.

6. The shaft-driven generator system of claim 5, wherein phase outputs of the inverter are connected to an input of a network choke in one-to-one correspondence, wherein an output of each network choke is connected to a first terminal of a corresponding series circuit formed of a capacitor and a resistor, and wherein second terminals of the series circuits formed of the capacitors and resistors are electrically connected to one another.

7. The shaft-driven generator system of claim 5, wherein the low-voltage gate-controlled turn-off semiconductor switches are low-voltage-class IGBTs having a blocking voltage of between 1200V and 1700V.

8. A ship comprising a shaft-driven generator system with:
a shaft-driven generator,
a network-side inductance, and
a DC-link converter, wherein the DC-link converter comprises
an AC/DC converter connected on an input side to the generator, and
a DC/AC inverter connected on an output side to an onboard network of the ship implemented as an island network, without employing an interconnected network-side filter, with the converter connected to the inverter by a DC link circuit,
wherein the inverter has at least two phase modules, each phase module having an upper valve branch and a lower valve branch, each upper valve branch and each lower valve branch having a plurality of two-pole sub-systems electrically connected in series, wherein each two-pole sub-system comprises a series circuit formed of two gate-controlled turn-off semiconductor switches and diodes connected antiparallel with the semiconductor switches in one-to-one correspondence, and a unipolar storage capacitor electrically connected in parallel with the series circuit, and
wherein a number of the two-pole sub-systems electrically connected in series in each of the upper valve branches and the lower valve branches is selected so as to allow use of low-voltage gate-controlled turn-off semiconductor switches.

* * * * *